UNITED STATES PATENT OFFICE 2,305,819

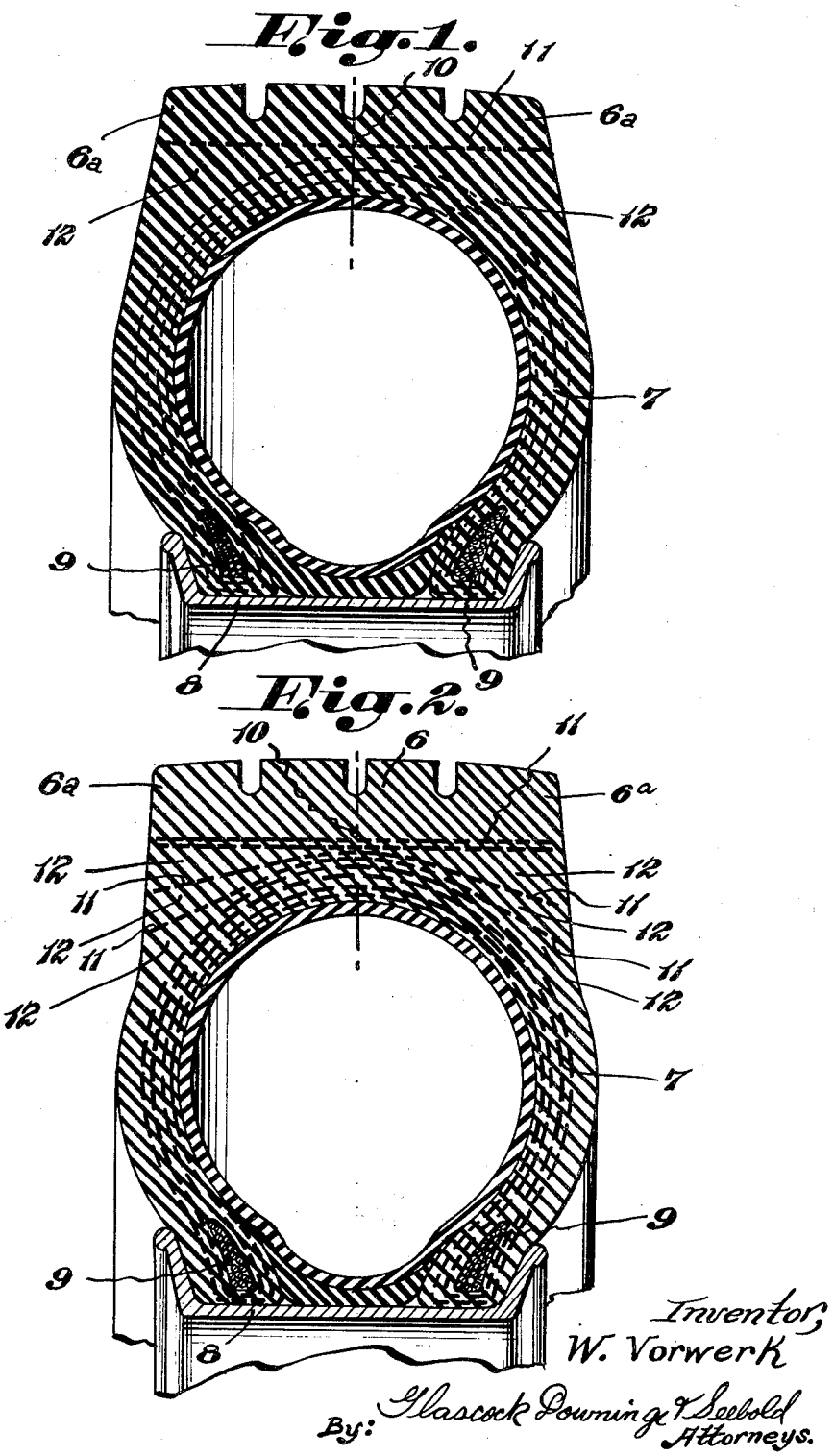

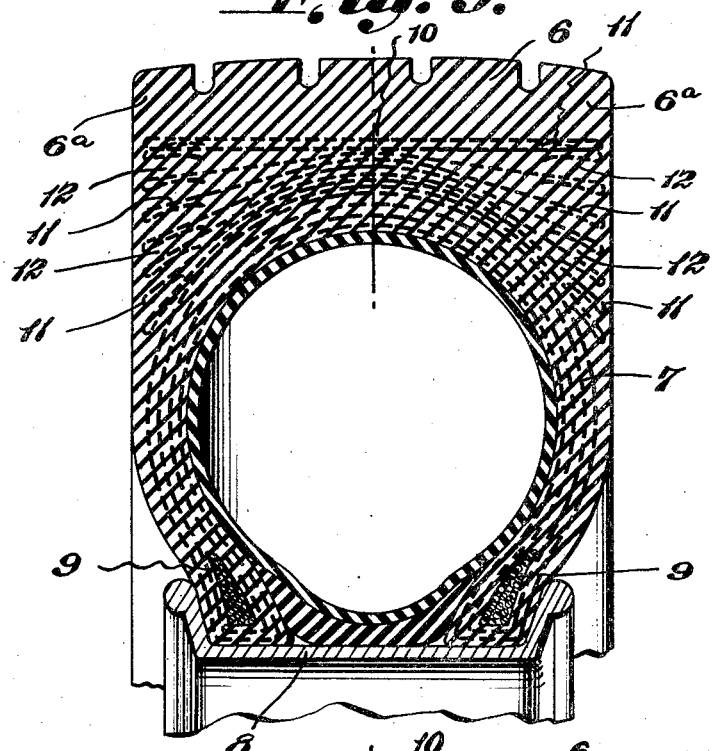
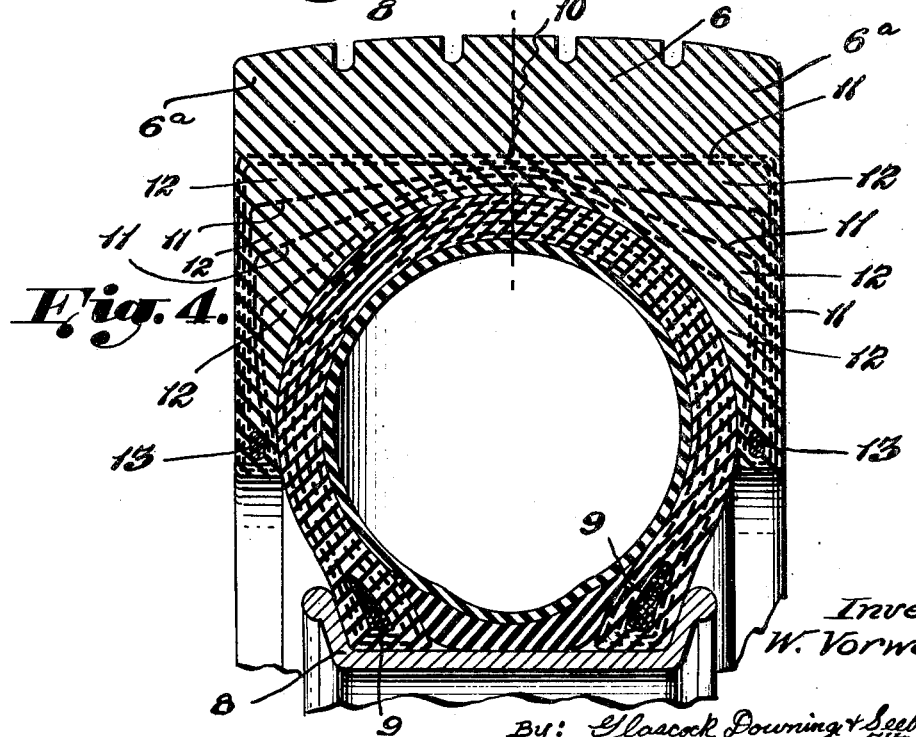

COVER FOR PNEUMATIC TIRES

Wilhelm Vorwerk, Wuppertal-Barmen, Germany; vested in the Alien Property Custodian Application January 4, 1939, Serial No. 249,313
In Germany January 12, 1938

1 Claim. (Cl. 152—352)

In the known pneumatic tires the surface of the rubber forming the tread has been relatively strongly arched in cross-section and a relatively high specific stressing of the tire has in consequence had to be tolerated, because, should the profile of the tread be made too flat, the tread will become dissociated from the tire body. For, on the tire being loaded and the lateral shoulders of the profile taking up part of the load, shearing forces will occur, which act tangentially with respect to the tire body. These forces will soon cause the tread to become dissociated from the tire body, more particularly at the sides of the tire, whereby the latter will be prematurely destroyed, owing to the formation of blisters.

In order to overcome this disadvantage and to enable covers for pneumatic tires to be made with shoulders brought up so high that a straight or only slightly curved running surface is obtained, according to the invention a saddle-like support of the tread, more particularly of the shoulders which are brought up on either side, is proposed, such that the shearing forces acting at this place tangentially to the tire body are converted into a pressure which acts as nearly as possible perpendicularly to the tire body. According to the invention the saddle-like support of the tread is preferably effected in such a manner that one or more superposed fabric insertions which are taken over the crown of the tire body to both sides tangentially to the outside are provided in the rubber composing the tread and that these insertions are supported by wedge-shaped supports of rubber or of a combination of rubber and fibrous material or of any other suitable material in such a manner that the elastic effect of the lower shoulder parts of the rubber forming the tread is as far as possible eliminated and the pressure acting on the insertions is deflected in a circular arc about the vortex of the tire body to the latter. In this way the detrimental shearing forces are eliminated, so that the load on the shoulders of the tire is directed as a force acting perpendicularly to the tire body. This makes it impossible for the lateral shoulders of the rubber forming the tread to become dissociated from the tire body.

As therefore, even when the shoulders are built up laterally, any dissociation of the tread from the tire body is no longer to be feared, it is possible in accordance with the invention to bring up the tire profile in its entire width and thereby to produce a pneumatic tire having a running surface which is straight or only slightly curved across its entire width. By this arrangement the high specific stressing is avoided, which occurs with pneumatic tires having a relatively strongly curved tread surface. In the cover according to the invention the stressing is distributed over the whole of the increased running surface, whereby, even at considerable speeds of travel, the heating and wear of the cover will be less than hitherto.

Various other objects will appear from the following description of the invention, reference being made to the accompanying drawings in which Figs. 1 to 4 are cross sectional views of several constructional embodiments of the present invention; Fig. 3 being the preferred form of the invention.

In all embodiments with reference to Figs. 1 to 4, 6 is the rubber of the tread of the tire cover with the upwardly extended shoulders 6a on either side. 7 is the tire body which is built up in known manner from layers of fabric, and the ends of which are widened to form beads for the purpose of fixing the tire in the rim 8 in known manner by means of wire rings 9.

Referring to Fig. 1, the rubber tread 6 is provided with an insertion 11 which extends tangentially outwardly on both sides above the vertex 10 of the tire body 7 and is supported by wedge-shaped supports 12 comprising a combination of rubber or other suitable material and fibrous material, in such a manner that the elastic effect of the lower shoulder portions of the tread rubber is eliminated as far as possible and the pressure acting on the insertion when the tire is loaded is deflected in a circular arc about the vertex 10 of the tire body.

In the form of the saddle-like support of the rubber of the tread upon the tire body shown in Fig. 2, the rubber of the tread has built up to the horizontal below it a plurality of insertions 11 extending towards the sides tangentially to the tire body 7 and fanwise in cross section, as well as a plurality of supporting wedges 12 of rubber or other materials. The ends of the insertions 11 extend close up to the sides of the tire profile.

In the example shown in Fig. 3 the rubber of the tread is supported below in the same manner as in the case of the construction shown in Fig. 2. However, in this case the insertions which extend to the sides of the profile are folded over at the ends and are returned into the wedge-shaped intermediate layers 12.

Since the saddle-like support of the rubber of the tread is considerably more rigid or more inelastic than the tread rubber itself, the tire cover, as shown in Fig. 4, may in certain cases be constructed as a separate part and be vulcanized onto an existing pneumatic tire or may be held thereon by the air pressure of the pneumatic tire. The lateral parts in this tire cover are reinforced by means of inserted wire rings 13. Further, the insertions 11 extend to within the sides of the placed-on tread surface and are passed downwardly and around the reinforcing rings 13 and anchored there.

The insertions for forming the saddle support in the rubber of the tread may consist of rubberized fibrous materials or of cord threads or cord fabric, the insertions being preferably arranged in such a manner that they extend diagonally or crosswise with respect to one another.

By extending the lateral shoulders of the tread rubber 6 upwardly the surface of the tread may be given a straight or slightly curved tread surface which in turn enables the height of the profile of the actual tread rubber to be increased, since in the case of the tire covers according to the invention, the unavoidable heating which takes place in the case of strongly arched tread surfaces, is avoided. In order to conduct away any slight heating of the profile which may be produced, the tread wall according to the invention may be provided with suitable cut away portions or depressions or cavities.

What I claim is:

In a tire of the character described, the combination of a tire body with an arched periphery, a rubber tread having a substantially flat tread surface, and saddle-like means supporting the rubber tread on the tire body comprising reinforcing members extending to the sides of the profile of the rubber tread, and supporting wedges of rubber between said reinforcing members, the ends of the reinforcing members being folded over and taken back into said supporting wedges.

WILHELM VORWERK.